Figure 1:
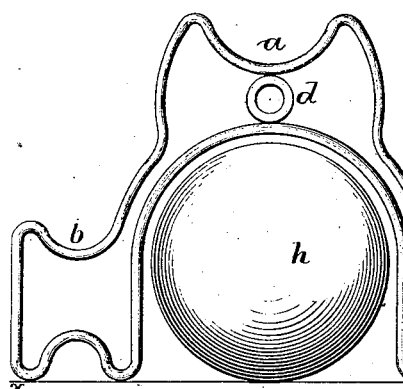
Figure 2:
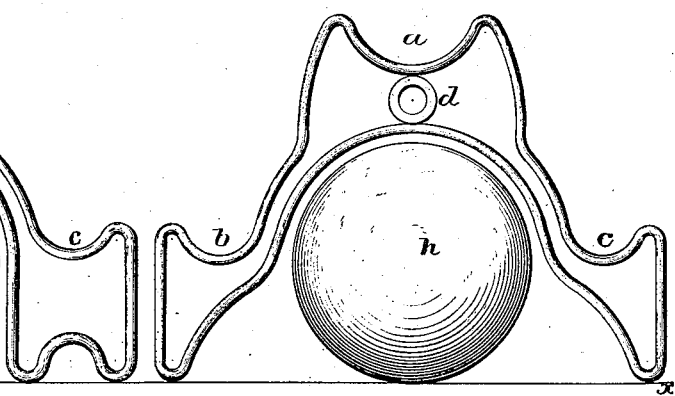
Figure 3:
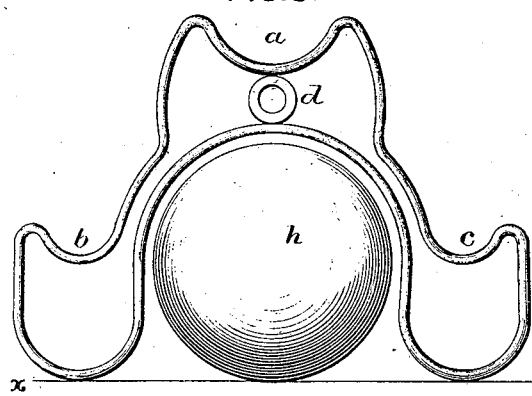
Figure 4:
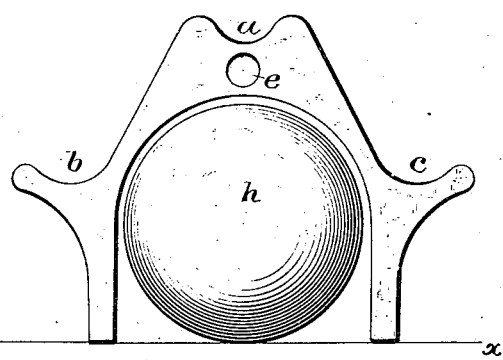

(No Model.)

J. N. McINTIRE.
BILLIARD BRIDGE.

No. 304,216. Patented Aug. 26, 1884.

ATTEST.
J. Henry Kaiser.
Harry L. Amer.

INVENTOR.
J. N. McIntire

UNITED STATES PATENT OFFICE.

JACOB N. McINTIRE, OF NEW YORK, N. Y.

BILLIARD-BRIDGE.

SPECIFICATION forming part of Letters Patent No. 304,216, dated August 26, 1884.

Application filed June 19, 1884. (No model.)

*To all whom it may concern:*

Be it known that I, JACOB N. MCINTIRE, of New York, in the county of New York and State of New York, have invented certain new and useful Improvements in Billiard-Bridges; and I do hereby declare that the following is a full, clear, and exact description thereof, reference being had to the accompanying drawings, making part of this application.

My invention relates to certain new and useful improvements in that kind of bridge used on billiard and pool tables, in which the construction is such as to permit the placement of the bridge over a ball resting on the table. This kind of bridge has been sometimes known as a "straddle-bridge," and as heretofore made such bridges have been useful only in the emergencies where, in order to get a rest for the cue, the bridge has had to be placed so as to straddle some ball on the table lying in close proximity to the cue-ball, or in such a position as to interfere with the convenient use of the bridge of more ordinary construction.

My invention has for its object to provide for use a straddle-bridge which shall also be adapted for use on all occasions in which it is now customary to use the other kind or lower construction of bridge; and to this main end and object my invention may be said to consist in a bridge adapted to straddle a ball on the table and afford a rest for the player's cue over and above the ball straddled, said bridge being formed or provided with supplementary or additional cue-rests located far beneath the rest, which is arranged centrally of the bridge and at such elevations that said supplementary rests may be used in the same manner and for the same purposes as those of the ordinary low bridge.

To enable those skilled in the art to make and use my invention, I will now proceed to more fully describe it, referring by letters of reference to the accompanying drawings, in which I have shown my improvements carried out in those forms which I now deem the best, and in which I have so far practiced my invention.

At Figures 1, 2, 3, and 4 are represented various forms or designs of my improved straddle-bridge, in which the bridge is composed preferably of a wire or rod bent up or worked into the proper or suitable shape to afford feet-like portions, which rest on the bed of the table, and a centrally-located notch or cue-rest, *a*, together with supplementary cue-rests *b* and *c*, located, as shown, at either side of the central rest, *a*, and much lower down. In all these views, *h* illustrates an ordinary billiard or pool ball, over which the bridge is represented as having been placed, and the letters *x x* merely the surface or bed of the billiard-table. In each of these patterns of my improved bridge, *d* represents a metallic tubular extension projecting out a sufficient distance from the face of the bridge, and preferably made tapering, onto which is fitted and secured the tapering stick or handle.

Figure 5:
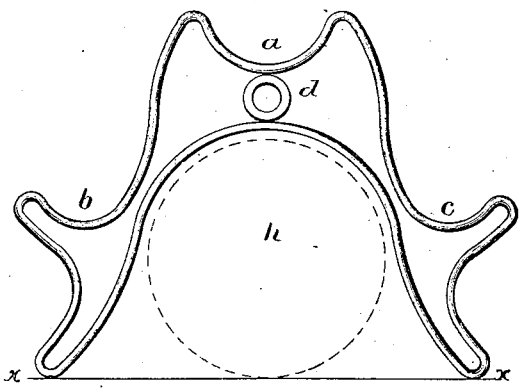

At Fig. 5 is shown a modification, in which the bridge (of a somewhat different pattern) is composed of either a plate of metal or a thin slab of wood—such as is usually used in the making of bridges—provided with an aperture at *e*, into which the end of the handle or stick may be inserted and fastened in the usual manner, this modified form of the invention having, like the form shown in the other figures, three notches or cue-rests, one of which, *a*, is located centrally and necessarily high up as the bridge is straddled, the ball *h*, and the other two of which, *b* and *c*, are located at either side and as low down as the notches of the ordinary low bridge.

Of course, in carrying out the main feature of my invention, the bridge may be made of any desired material, size, and design, so long as the structure is such, as shown, that while the bridge is capable of being placed on the table over and so as to clear a ball such as is seen at *h*, there shall be provided notches or rests for the player's cue, which are not materially higher than those of the ordinary bridge, which is not capable of this under conditions or circumstances under which the straddle is indispensable.

Figure 6:
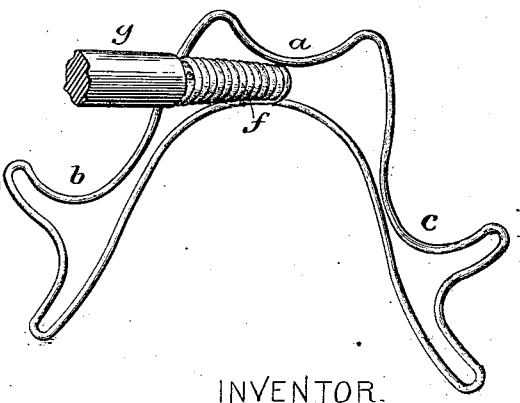

At Fig. 6 I have shown the specific and convenient form of wire bridge, in which the wire composing the frame of the bridge has its ends shaped or formed into a sort of corkscrew socket, which is adapted to receive and within which may be securely fastened the tapering end of the bridge stick or handle *g*. I consider this construction of stick-holding socket or device as an exceedingly simple and desirable one in cases where the bridge is composed of wire; and this device, it will be understood, may be used with advantage in any and all forms of the bridge when the latter may be composed of a rod or bent wire. Preferably the formation of the bridge is such that the feet-like portions shall extend outwardly beneath the supplementary or side rests, b and c, in order that in using either of the side notches there may be no tendency in the bridge to tip sidewise during the manipulation of the player's cue.

Having now explained the nature of my invention, and wishing it to be understood that, so far as the main feature thereof is concerned, no precise form or design is essential, so long as the shape of the bridge be such as to afford, in addition to the usual high rest of a straddle-bridge, lower cue-rests, such as are found in ordinary low bridges, what I claim as new, and desire to secure by Letters Patent, is—

1. A billiard or pool bridge adapted to be placed over or straddle a ball on the table, and provided with one or more notches or cue-rests located sufficiently low down for use in substantially the same manner and for the same purpose as the cue rests or notches of the ordinary low-down bridge, substantially as hereinbefore set forth.

2. As a specific means for the attachment of the stick or handle to the bridge, when the latter may be of the form of a rod or wire, the socket-like device f, formed of the spiral coil of one or both ends of the rod or wire of which the bridge is composed, substantially as set forth.

In testimony whereof I have hereunto set my hand this 12th day of June, 1884.

J. N. McINTIRE.

In presence of—
    JACOB FELBEL,
    E. J. BLEZARD.